(No Model.)  5 Sheets—Sheet 1.

J. H. ROGERS.
METHOD OF AND APPARATUS FOR SYNCHRONIZING AND REGULATING THE MOVEMENTS OF MOTORS.

No. 358,753.  Patented Mar. 1, 1887.

(No Model.) 5 Sheets—Sheet 3.

J. H. ROGERS.
METHOD OF AND APPARATUS FOR SYNCHRONIZING AND REGULATING
THE MOVEMENTS OF MOTORS.

No. 358,753. Patented Mar. 1, 1887.

(No Model.) 5 Sheets—Sheet 4.

J. H. ROGERS.
METHOD OF AND APPARATUS FOR SYNCHRONIZING AND REGULATING THE MOVEMENTS OF MOTORS.

No. 358,753. Patented Mar. 1, 1887.

Witnesses:
H. N. Low
E. F. Dick

Inventor:
J Harris Rogers
by Marcellus Bailey
his attorney.

(No Model.)
J. H. ROGERS.
METHOD OF AND APPARATUS FOR SYNCHRONIZING AND REGULATING THE MOVEMENTS OF MOTORS.
No. 358,753. Patented Mar. 1, 1887.
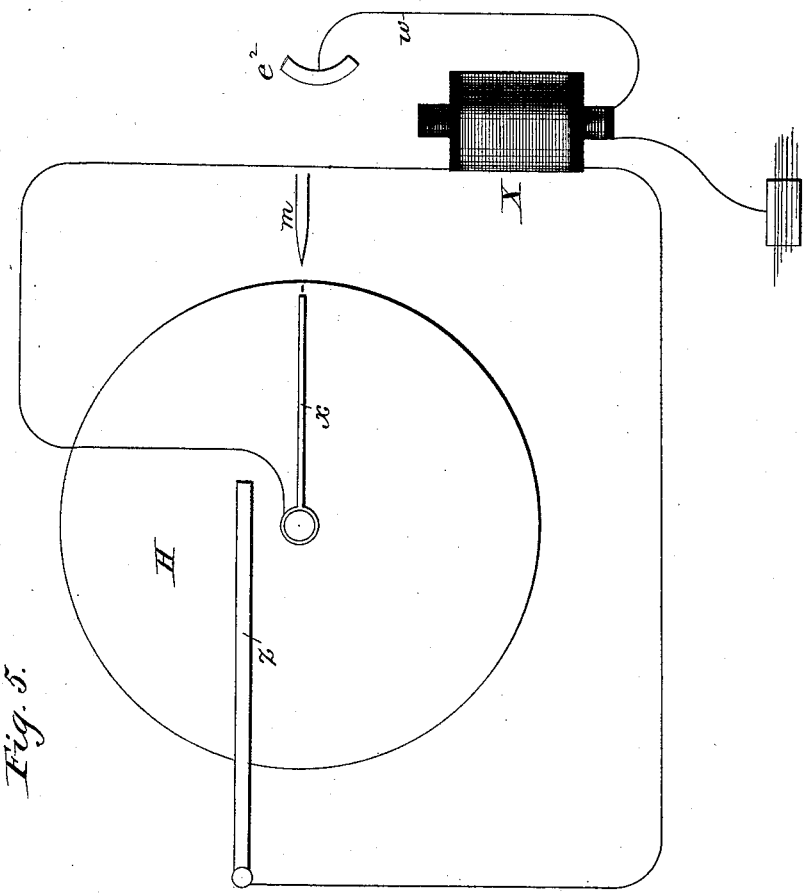
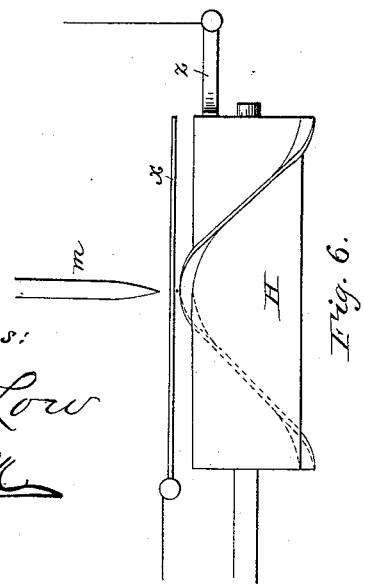

UNITED STATES PATENT OFFICE.

J. HARRIS ROGERS, OF BLADENSBURG, MARYLAND.

METHOD OF AND APPARATUS FOR SYNCHRONIZING AND REGULATING THE MOVEMENTS OF MOTORS.

SPECIFICATION forming part of Letters Patent No. 358,753, dated March 1, 1887.

Application filed August 10, 1886. Serial No. 210,545. (No model.)

*To all whom it may concern:*

Be it known that I, J. HARRIS ROGERS, of Bladensburg, Prince George county, and State of Maryland, have invented certain new and useful Improvements in Methods of and Apparatus for Synchronizing or Regulating the Movements of Motors and other Rotating Bodies, of which the following is a specification.

My invention has reference to means for synchronizing or regulating the movements of rotary motors or other rotating bodies, and it is applicable especially to electric motors. In many of the uses to which electric motors are applied it is necessary or desirable that the operated parts should move in unison.

To this end it is essential that the governing parts should themselves be uniform in their action. This uniformity is needful in printing-telegraphs, electric clocks, and various other classes of apparatus. My present invention, however, is concerned with the synchronizing of motors as such without special reference to the uses for which they are adapted.

My invention consists, broadly, in correcting the movements of one or more of a series of motors or rotating bodies by reference to the deviation or variation from a certain normal position or appearance of a visual manifestation caused or affected by or in the rotation of the motor or motors.

In carrying out my invention I have introduced certain novelties in general construction and in detail, which will be fully described hereinafter, and more particularly pointed out in the claims.

Figure 1:
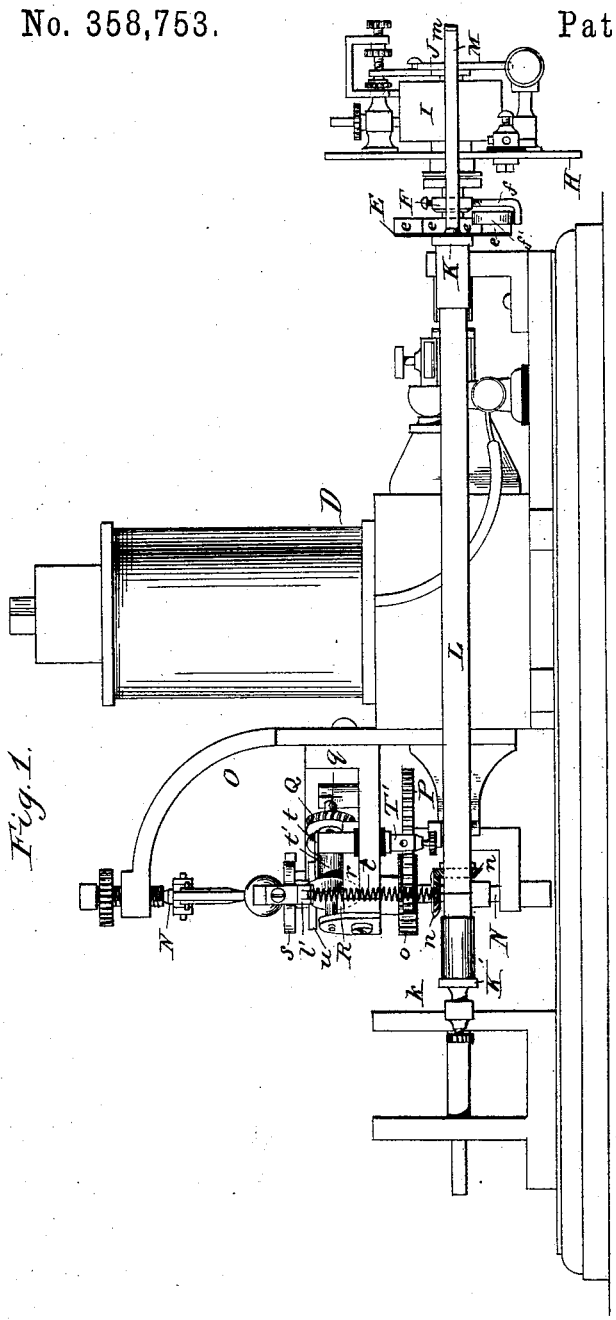
Figure 2:
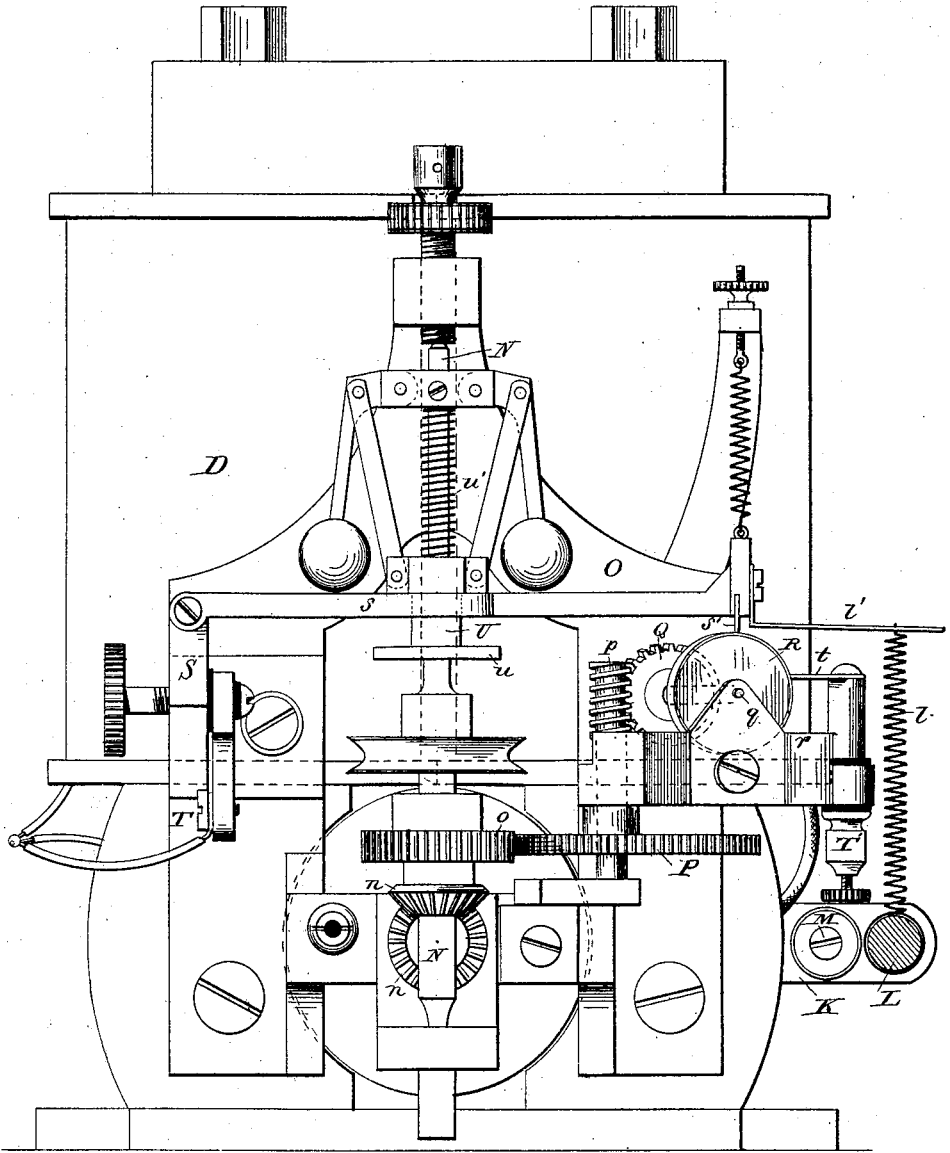
Figure 3:
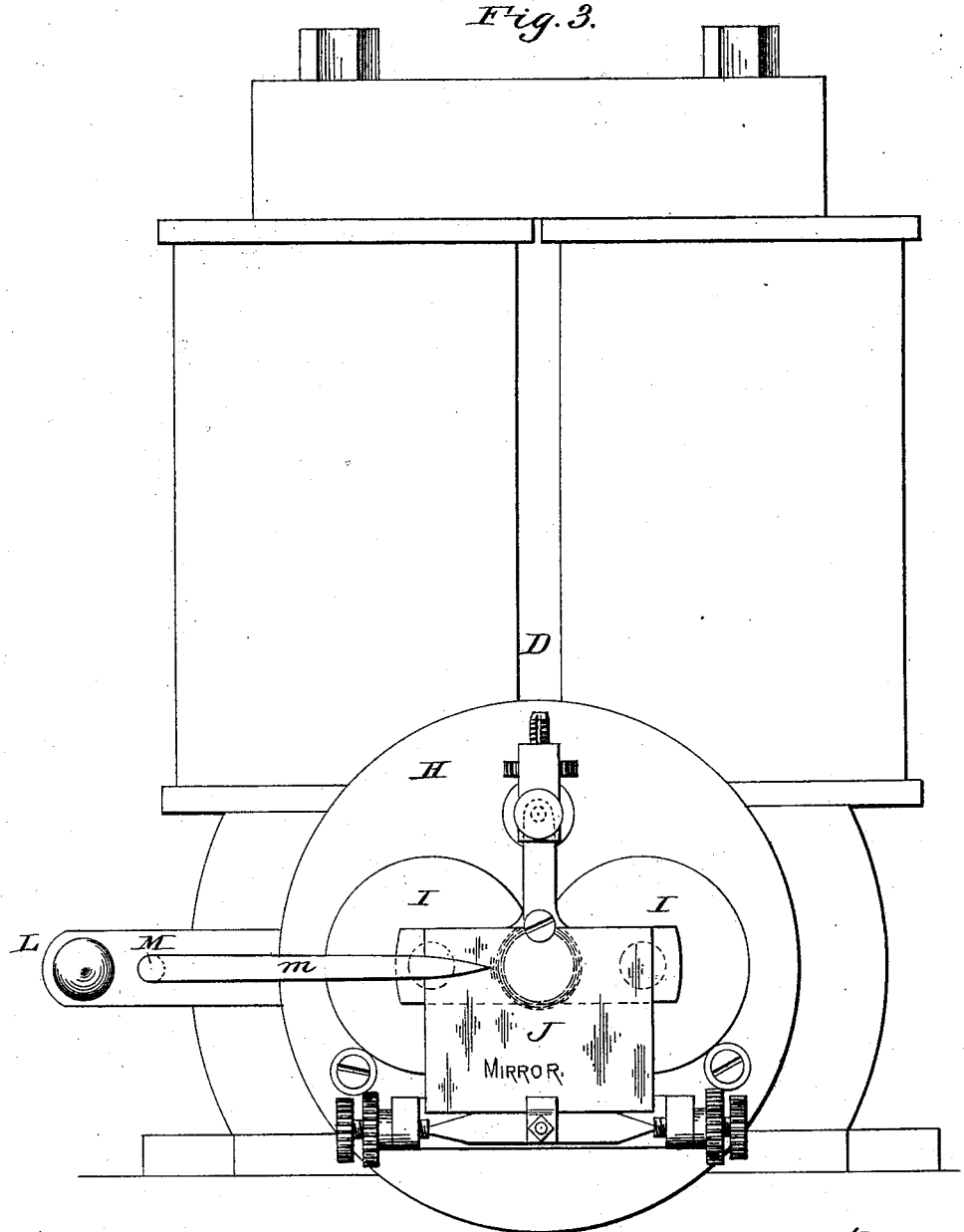
Figure 4:
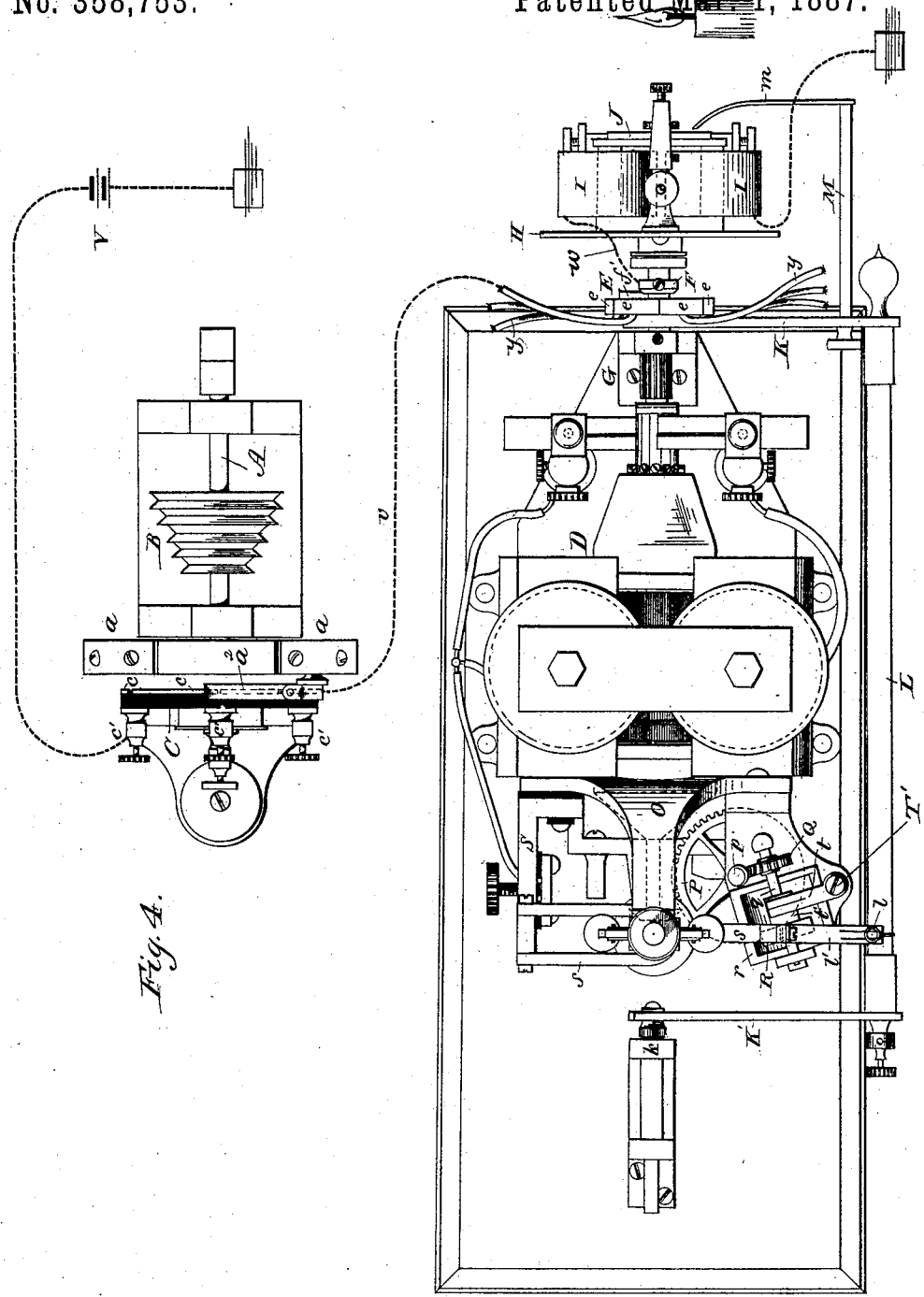

In the drawings which illustrate my invention and form a part of this specification, Figure 1 is a side elevation of an electric motor having my synchronizing apparatus applied thereto, the terminals and brushes of a connected motor being also shown. Fig. 2 is an end elevation of the motor and its governing or regulating mechanism. Fig. 3 is an elevation looking toward the end opposite that seen in Fig. 2. Fig. 4 is a plan. Figs. 5 and 6 illustrate modifications.

Referring to the drawings by letter, A is the shaft of a motor located at a sending-station. I have represented on this shaft a belt-wheel, B, thereby fitting it to be run from a steam-engine or other suitable source of power. Instead of this it may be rotated by the operating mechanism of a printing-telegraph transmitter. On the shaft A are mounted two insulated segments, $a$ $a$, to one of which is attached a brush, $a^2$. In proximity to the segments is fixed a standard, to which is secured a circular piece, C, of hard rubber or other good insulator. A series of insulated segments, $c$ $c$, are secured around the periphery of the insulating-piece C, and each segment is provided with a binding-post, $c'$, as shown. These segments (six in number as I have represented them) are located in the path of the brush $a^2$, which makes contact with them as the shaft rotates.

At a receiving-station is located a rotary electric motor, D, of any suitable type, provided with any suitable governor or regulator. On the shaft of the motor, or on an extension thereof, is loosely mounted a disk of hard rubber, E, to which are secured insulated segments $e$ $e$, corresponding in number to the segments $c$ $c$ at the sending-station. On the same shaft or extension is keyed a ring, F, and in this ring is secured a bent rod, $f$, which carries a brush, $f'$, for making contact with the segments. A pinion, G, on the motor-shaft is the medium through which connection is made with the receiving-instrument of a printing-telegraph or with any other mechanism which it is desired to operate.

At the extremity of the motor-shaft a disk, H, is rigidly secured. The said disk serves as a base for an electro-magnet, I, which is provided with the usual armature, front and back stop, and retractile spring. A mirror, J, is secured to the back of the armature, for a reason that will be explained hereinafter. By this arrangement the electro-magnet, its armature, and the mirror are caused to revolve with the motor-shaft.

A horizontal arm, K, is secured to the inner side of the insulating-disk E, and a similar arm, K', is pivoted to an independent standard, $k$, near the other end of the motor. A rod, L, passes through the outer ends of these arms and serves as a means by which they can be raised or lowered. They are normally held in substantially a horizontal position by means of a spring, $l$, secured at one end to the rod L and at the other to a projection, $l'$, from a contact-arm of the governor. It is understood that the disk E does not rotate with the shaft of the motor, and that the lifting or depressing of the rod L will move the said disk and change the position of the segments $e\,e$ from their normal one. A rod, M, extends forward from the arm K, in which it is secured, and carries at its forward end a pointer, $m$. The latter extends over into close proximity to the mirror J.

The function and operation of the parts above described will be explained hereinafter.

The governor which I show in connection with the motor is in its main features of the well-known Phelps type. The motor-shaft in this instance communicates motion to an upright shaft, N, through the bevel-wheels $n\,n$. The shaft N is the governor-shaft, carrying the usual governor-balls. O is the frame of the governor, in which the shaft N is mounted. A pinion, $o$, on the said shaft engages with the cog-wheel P, at the upper end of whose shaft is formed a worm, $p$. The latter operates, through a gear-wheel, Q, and shaft $q$, a platinum-covered contact-wheel, R, which moves through oil in a box, $r$. S is a bracket secured to the frame O, but insulated therefrom. To said bracket is pivoted a yoked piece, $s$, the free end of which makes contact through a platinum point, $s'$, with a wheel or disk, R. The spring $l$, as has been stated already, is connected to a projection, $l'$, extending from the contact-arm $s$. In this way, it will be observed, the spring serves a double purpose of keeping the rod L in position and holding the arm $s'$ normally in good contact with the disk R. Of course when the arm L is raised the contact will be lightened, and when it is lowered the contact will be increased. It will be observed that there are binding-posts T and T', connected, respectively, to the bracket S and the disk R, for making the necessary electrical connections. The latter binding-post is insulated where it passes through the frame O, and is electrically connected to the disk through a spring, $t$, and a hub, $t'$, on the disk.

It should be stated that the disk R and hub $t$ are insulated from their shaft.

The yoke of the contact-arm $s$ passes around a sleeve, U, on the shaft N and above a disk, $u$, on the said sleeve. This sleeve is normally pressed downward by a spring, $u'$. The outward movement of the governor-balls, however, due to the rapid rotation of the shaft, lifts the sleeve, and if the outward movement becomes extreme on account of an excessively rapid rotation the sleeve and the disk thereon may be raised far enough to lift the arm $s$ out of contact with the wheel R.

Such being the main features of the mechanical construction and operation, it remains chiefly to describe the electrical circuits and connections.

The motor D may be fed from any suitable generator. The circuit of the said generator will generally pass to the field-magnet of the motor through the contacts R and $s'$. It may, however, pass through those contacts to the armature, or, in the case of a series motor, these contacts may be located in a loop between the armature and the field-magnet. This being the case, it is evident that a too rapid rotation of the motor will ultimately correct itself by the breaking of the motor-circuit through the action of the governor; but this would only take place under unusual circumstances. The other circuit-connections are illustrated by a diagram in Fig. 4. V is a battery, one pole of which is connected to the ground. The other pole is connected to one of the binding-posts on the disk C. The particular segment $c$ to which that binding-post is attached is connected by the brush $a^2$, segment $a$, and a wire, $v$, with one of the segments $e$ on the disk E. For convenience I will call the former segment $c^2$ and the latter segment $e^2$. From the latter segment the circuit continues when the proper contact is made by way of brush $f'$, bent rod $f$, ring F, and wire $w$ to and through the magnet I and to ground. Now it is evident that whenever the brush $a^2$ is on the segment $c^2$ and the brush $f'$ is on the segment $e^2$ at the same instant of time the circuit of battery V will be complete and the magnet I will be energized and attract its armature. In the normal operation of the two motors it is designed that they should rotate with such uniform speed that this circuit shall be completed once during each revolution of the motor-shaft and at equal intervals during successive rotations, or, to express it in another way, that the relative positions of the two brushes with respect to the two segments concerned shall be continually and exactly the same. There will necessarily be deviations from this if the movements of the motors are controlled by independent regulators, and it is to correct such deviations that I have invented my supplementary devices.

At a suitable distance from the mirror J I place a candle or other source of light. As the mirror rotates with the motor-shaft the image of the candle will appear in the mirror as a ring or circle of light, or rather it would appear so if the mirror rotated constantly in the same plane; but the movement of the mirror caused by the attraction of the armature disturbs the uniform appearance of the image and causes a slight projection like a nib to appear at one portion of the ring or circle. If, now, the motor D and the motor at the sending-station rotate with absolute uniformity, the circuit of battery V will be completed at absolutely uniform intervals, the armature of magnet I will be attracted also at uniform intervals, and the nib or projection of light will always appear in the same position on the mirror. If, however, the circuit is completed a little sooner or a little later than at the expiration of the normal interval, the nib will appear a little in advance or in the rear of its normal position. The rod L is first adjusted so that the pointer *m* shall point to the position which the nib normally occupies. It can always be seen, therefore, by observing the positions of the pointer and the nib or projection whether the motors are in unison. Suppose, now, it is found that the nib is in a position where it indicates that the motor D is in advance of its companion motor. An operator will slowly lift the rod L, thereby relieving somewhat the contact at R *s'*, and at the same time readjusting the relative positions of the segment $e^2$ and the brush *f'*. The lightening of the contact R *s'* will slow up the motor, causing it to resume its normal speed, whereupon the nib or projection will reassume its original position and the rod L can be lowered into place. Should the nib pass beyond its first position, indicating that the motor is running too slow, the operator will press down on the rod L, thereby increasing the speed of the motor through a better contact at R *s'* and again readjusting the relative positions of the segment $e^2$ and the brush *f'*.

The pointer *m* is so located with relation to the nib or projection that in order to correct the movement of the motor it is necessary in every instance to move the pointer toward the new position of the nib.

*y y* are flexible electrical connections running out from the segments *e e* to any electrical devices which it is desired to operate. These correspond to the different segments *c c*, with which they have electrical connection.

Fig. 5 illustrates a modification of my visual device for observing the variations of the motors. In this construction the wire *w*, instead of passing to the magnet I, passes to the primary of an induction-coil, X. The secondary is connected in one direction by wire with a conducting-rod, *x*, the end of which is placed in proximity to the periphery of the rotating disk H. The other terminal of the secondary is connected by wire with a conducting-rod, *z*, which bears against the surface of said disk. Whenever the circuit of battery V is completed, a spark will pass between the edge of the disk H and the end of the conducting-rod *x*, and the position of this spark will indicate, like the position of the nib on the reflected image, whether the motors are running in unison. I may locate between the magnet I and ground another electric motor having the same connections from the segment $e^2$ and brush $f^2$ that the motor has from segment $c^2$ and brush $a^3$. In this way I can easily control a series of motors.

The visual manifestation need not necessarily occur at some point in a circular path, as will be the case in both of the arrangements shown by Figs. 3 and 5.

In the modification shown in Fig. 6 the visual manifestation is caused by a spark, as in Fig. 5; but in this instance the line or path at some point of which the manifestation occurs is straight.

In Fig. 6 H is a rotary cylinder having a helical rib of conducting material. The conducting-rod *z* preserves during the rotation of the cylinder an electrical connection with the rib through the material of the cylinder or otherwise. The conducting-rod *x* is placed parallel with the axis of the cylinder and in close proximity to the surface of revolution produced by the helical rib. The latter completely encircles the cylinder once.

When the spark occurs, it will pass between some point of the rod *x* and that portion of the rib which is nearest. In case of synchronism, the spark will take place opposite the pointer *m*. If it takes place to the right or left of the pointer, such fact will indicate that the motors are not in unison, and the operator will make the proper correction, as already described.

Having now described my invention, what I claim, and desire to secure by Letters Patent, is as follows:

1. The method of securing the substantial uniform rotation of a rotary motor or body, which consists in providing a visual manifestation of substantially the character described, which will vary or deviate from a normal or initial point according to the departure from uniform rate of rotation, and adjusting the contacts of said motor by reference to said deviation, substantially in the manner and for the purposes hereinbefore set forth.

2. The combination, with the shaft of a rotary motor, a brush operated thereby, and an insulated segment with which the brush makes contact intermittently, of an electro-magnet in circuit with the brush and segment, the said magnet being mounted on the shaft and having a mirror attached to its armature, as and for the purposes set forth.

3. The combination, with two rotary motors, each having a rotating brush and an insulated segment with which the brush makes intermittent contact, of an electro-magnet in circuit with both brushes and segments, the said magnet being mounted on the shaft of one of the motors and having a mirror attached to its armature, as and for the purposes set forth.

4. The combination, with the shaft of a rotary motor, a brush operated thereby, and a segment with which the brush makes intermittent contact, said segment and brush being adjustable with reference to each other, of means, operated by the closure of the contact, for causing a visual manifestation whose position with reference to a normal or initial point will vary to correspond with changes in the relative position of the brush and segment, substantially as and for the purposes hereinbefore set forth.

5. The combination, with a rotary electric motor having a rotating brush and a segment with which the brush makes intermittent contact, of means mounted on the motor-shaft for causing a visual manifestation to assume a normal position when the intervals of contact are uniform, and a lever operatively connected to the said segments, as and for the purposes set forth.

6. The combination, with a rotary electric motor having a rotating brush and a segment with which the brush makes intermittent contact, and means mounted on the motor-shaft for causing a visual manifestation to assume a normal position when the intervals of contact are uniform, of a lever operatively connected to the said segment and a hand or pointer attached to the said lever, the said hand pointing normally toward the said normal position, as and for the purposes set forth.

7. In a regulating mechanism for an electric motor, a lever operatively connected both with the contacts of the motor-circuit, between the motor and the generator, and with segments on the motor-shaft from which one or more external circuits are led off, as and for the purposes set forth.

In testimony whereof I have hereunto set my hand this 29th day of July, 1886.

J. HARRIS ROGERS.

Witnesses:
EWELL A. DICK,
M. A. CUSTIS.